(12) United States Patent
Liu et al.

(10) Patent No.: US 10,684,111 B2
(45) Date of Patent: Jun. 16, 2020

(54) NON-DESTRUCTIVE DETECTION METHOD AND DEVICE OF EFFECTIVE ANCHORAGE DEPTH OF FULL-LENGTH BONDING ANCHOR

(71) Applicant: POWERCHINA HUADONG ENGINEERING CORPORATION LIMITED, Hangzhou, Zhejiang Province (CN)

(72) Inventors: Ning Liu, Hangzhou (CN); Chunsheng Zhang, Hangzhou (CN)

(73) Assignee: POWERCHINA HUADONG ENGINEERING CORPORATION LIMITED, Hangzhou, Zhejiang (CN)

( * ) Notice: Subject to any disclaimer, the term of this patent is extended or adjusted under 35 U.S.C. 154(b) by 25 days.

(21) Appl. No.: 16/383,644

(22) Filed: Apr. 14, 2019

(65) Prior Publication Data

US 2019/0234724 A1    Aug. 1, 2019

Related U.S. Application Data

(63) Continuation of application No. 15/243,970, filed on Aug. 23, 2016, now abandoned.

(30) Foreign Application Priority Data

May 10, 2016 (CN) .......................... 2016 1 0303768

(51) Int. Cl.
*G01B 5/18* (2006.01)
*G01B 17/00* (2006.01)
(Continued)

(52) U.S. Cl.
CPC ............... *G01B 5/18* (2013.01); *E21D 21/00* (2013.01); *G01B 21/18* (2013.01); *G01M 7/08* (2013.01); *G01B 2210/66* (2013.01)

(58) Field of Classification Search
None
See application file for complete search history.

(56) References Cited

U.S. PATENT DOCUMENTS 6,003,376 A * 12/1999 Burns ..................... G01S 3/808
73/584

FOREIGN PATENT DOCUMENTS

CN 1808060 A * 7/2006
CN 103913738 A * 7/2014
(Continued)

*Primary Examiner* — Jennifer E Simmons
*Assistant Examiner* — Ruben C Parco, Jr.
(74) *Attorney, Agent, or Firm* — Proi Intellectual Property US; Klaus Michael Schmid

(57) ABSTRACT

The present invention relates to a method and an apparatus for non-destructive testing of an effective anchorage depth of a fully grouted anchor bolt, which are applicable in geotechnical engineering. The method provided by the invention is for non-destructive testing of an effective anchorage depth of a fully grouted anchor bolt; the method is convenient to operate, non-destructive to an anchor bolt, and capable of testing an anchorage length of the anchor bolt. The present invention further provides an apparatus for non-destructive testing of an effective anchorage depth of a fully grouted anchor bolt. The apparatus has a simple structure, is convenient to install, and is capable of measuring an anchorage length of an anchor bolt without damaging the anchor bolt.

3 Claims, 3 Drawing Sheets

(51) Int. Cl.
*E21D 20/00* (2006.01)
*E21D 21/00* (2006.01)
*G01B 21/18* (2006.01)
*G01M 7/08* (2006.01)

(56) References Cited

FOREIGN PATENT DOCUMENTS

| JP | 07208097 A | * | 8/1995 |
| JP | 09004397 A | * | 1/1997 |
| JP | 2007046388 A | * | 2/2007 |

* cited by examiner

NON-DESTRUCTIVE DETECTION METHOD AND DEVICE OF EFFECTIVE ANCHORAGE DEPTH OF FULL-LENGTH BONDING ANCHOR

TECHNICAL FIELD

The present invention relates to a method and an apparatus for non-destructive testing of an effective anchorage depth of a fully grouted anchor bolt, which are applicable in geotechnical engineering.

BACKGROUND

Anchor bolts have been widely used in underground engineering of areas such as mines, hydropower, and transportation. Particularly, using anchor bolts, together with concrete, as permanent support in large underground cavern groups and high slopes has been employed in many engineering projects. An anchor bolt primarily has functions such as suspension, extrusion, and reinforcement, and functions to convert a radially pressing pressure of surrounding rock into a tangential pressure, so as to make use of a bearing capacity of the surrounding rock, strengthen self-stability of the surrounding rock, and prevent a plastic zone of the surrounding rock from being further expanded. Bolting and grouting can reinforce surrounding rock, increase cohesion and an angle of friction of the surrounding rock, and improve the strength of rock, so as to enable the surrounding rock to be cemented into a continuous reinforcement ring and to form an integral support structure system.

Anchor bolt can be classified, according to an anchoring form, into fully grouted anchor bolt, end anchorage type anchor bolt, friction type anchor bolt, and the like, in which the fully grouted anchor bolt is most widely applied. The fully grouted anchor bolt means that an anchor bolt hole is fully filled with an adhesive material, and the adhesive material mainly includes cement slurry, cement mortar, quick-setting cement anchoring agent, resin (including cartridge and resin), and the like. A fully grouted anchor bolt is characterized in that, when the fully grouted anchor bolt is installed, an anchor bolt hole needs to be filled with an adhesive material, so as to enable a gap between a bolt body and a hole wall is densely filled by using the adhesive material, and the bolt body is anchored in rock after the adhesive material is set and hardened. The fully grouted anchor bolt is closely adhered to the hole wall by using the adhesive material. When the rock is deformed, a deformation stress of the rock is transmitted, through the adhesive material, to the anchor bolt to bear, that is, the anchor bolt provides a force for constraining the deformation to the rock, so as to reduce the deformation of surrounding rock.

In anchor bolt design of geotechnical engineering, a length of an anchor bolt is generally 3-6 m. In accordance with a mechanism of action of a fully grouted anchor bolt, after an adhesive material is filled, all parts of the fully grouted anchor bolt that are in contact with rock need to implement functions. However, due to flowability of the adhesive material and a limitation of an installation process, a part of length of the anchor bolt near an opening section fails to completely implement a function, which means that an anchorage length with respect to the rock fails to meet an original design requirement. Therefore, in FIG. 1, an anchor bolt is divided into an extended section, a free section, and an anchoring section. The extended section is secured to a rock wall by using a plate and a nut. The free section is a length that fails to implement a function of the anchoring bolt due to adhesion quality. The anchoring section actually implements a function in the engineering, and an engineering designer concerns the anchoring section most.

To ensure anchoring quality, a relativity large quantity of testing methods appears in engineering. A most common method for testing anchoring quality of an anchor bolt is over-coring an anchor bolt hole. Although this method can soundly test the anchoring quality, the method needs to damage an installed anchor bolt, and the anchor bolt needs to be replaced and installed again after the testing is completed. Later, non-destructive testing methods emerge. Most of the non-destructive testing methods are dependent on approaches such as ultrasound, acoustic emission, and the like. By means of collection of sound and light signals transmitted by a bolt body, a defect of and installation quality of an anchor bolt are determined. However, the foregoing non-destructive testing methods can merely determine installation quality of an anchor bolt, but fail to accurately measure an anchorage length of the anchor bolt.

SUMMARY

A technical problem to be resolved by the present invention is: providing, with regard to the foregoing existing problems, a method for non-destructive testing of an effective anchorage depth of a fully grouted anchor bolt that is convenient to operate, is non-destructive to an anchor bolt, and is capable of testing an anchorage length of the anchor bolt.

The present invention further provides an apparatus for non-destructive testing of an effective anchorage depth of a fully grouted anchor bolt, which is of a simple structure, is convenient to install, is of low costs, and is capable of measuring an anchorage length of an anchor bolt without damaging the anchor bolt.

A technical solution used in the present invention is: a method for non-destructive testing of an effective anchorage depth of a fully grouted anchor bolt, including:

impacting an end of an extended section of an anchor bolt for multiple times with different amplitudes, so as to enable the anchor bolt to generate different accelerations;

acquiring accelerations at different depths of the anchor bolt by using several accelerometers that are disposed at the different depths along the anchor bolt; and observing acceleration values obtained by the accelerometers, where if an acceleration value is stable, it is determined that the anchor bolt of a position at which a corresponding accelerometer is located is closely adhered to surrounding rock, and the position represents an effective anchorage length of the anchor bolt, and otherwise, if an acceleration value is noticeably vibrated, it is determined that adhesion of a position at which a corresponding accelerometer is located is insufficiently close, the anchor bolt is loose, and the position fails to represent an effective anchorage length of the anchor bolt.

Steps are as follows:

S01: installing the anchor bolt, including: installing the accelerometers on the anchor bolt, placing the anchor bolt at a center of a borehole, leading out transmission cables connected to the accelerometers, and fastening the anchor bolt to the borehole by using an adhesive material;

S02: installing an acceleration excitation apparatus and an acceleration monitoring apparatus, including: installing an acceleration excitation apparatus and an acceleration monitoring apparatus at the extended section of the anchor bolt after the adhesive material in the borehole reaches designed strength, and connecting the acceleration monitoring apparatus to the accelerometers by using the transmission cables; and S03: testing an effective anchorage length, including: axially applying a force to the anchor bolt by using the acceleration excitation apparatus; observing, by using the acceleration monitoring apparatus, the acceleration values obtained by the accelerometers, where if the anchor bolt is closely adhered to the surrounding rock, and an acceleration value is stable and is small, the position represents an effective anchorage length of the anchor bolt, and if an acceleration value is noticeably vibrated, it is indicated that the anchor bolt of the position is loose, and the position fails to represent an effective anchorage length of the anchor bolt.

The force axially applied by the acceleration excitation apparatus to the anchor bolt in step S03 is 10 KN-50 KN, and the force is gradually increased with an increment of 10 KN each time.

An apparatus for non-destructive testing of an effective anchorage depth of a fully grouted anchor bolt, configured to test an anchorage length of a fully grouted anchor bolt, where the anchor bolt is placed in a borehole that is fully filled with an adhesive material; the anchor bolt is fastened to a rock wall by using a steel plate at an opening of the borehole; an acceleration excitation apparatus that can apply an axial vibration force to the anchor bolt is installed at an extended section of the anchor bolt; several accelerometers are installed, along an axial direction of the anchor bolt, on the anchor bolt in the borehole; and the accelerometers are electrically connected to an acceleration monitoring apparatus outside the borehole by using transmission cables.

The acceleration excitation apparatus and the acceleration monitoring apparatus are installed in a sleeve, and are installed at an end of the extended section of the anchor bolt by using the sleeve; and the acceleration excitation apparatus is securely connected to the anchor bolt by using a connection rod and a loading ring.

A compression type dynamometer used to measure a vibration force of the acceleration excitation apparatus is disposed between the steel plate and the sleeve.

A plate is disposed between one end of the compression type dynamometer and the steel plate and a plate is disposed between the other end of the compression type dynamometer and the sleeve.

The sleeve is connected to a top end of a vertical stabilizer bar in a manner of capable of axially and horizontally moving along the anchor bolt, and the other end of the stabilizer bar is fastened to ground.

An electromagnetic vibrator is used as the acceleration excitation apparatus, and an acceleration vibration pickup is used as the acceleration monitoring apparatus.

Beneficial effects of the present invention are: with the present invention, anchoring quality is evaluated by using accelerations, so that no destruction to an anchor bolt is caused, a testing effect is more accurate, and structure reliability is higher; when adhesion of a position at which an accelerometer is located is insufficiently close, the accelerometer is loose when an anchor bolt is subjected to a power, and consequently, an acceleration value measured by the accelerometer vibrates.

The patent of the present invention relates to non-destructive testing, and therefore, no destruction to an anchor bolt is caused. Different from other non-destructive testing methods that require complex preparations and sophisticated testing equipment, in the present invention, site implementation is easy. Moreover, in the present patent, accelerometers are disposed at positions of different depths of an anchor bolt, so that a testing effect is more accurate, and structural reliability is higher.

DETAILED DESCRIPTION

Figure 1:
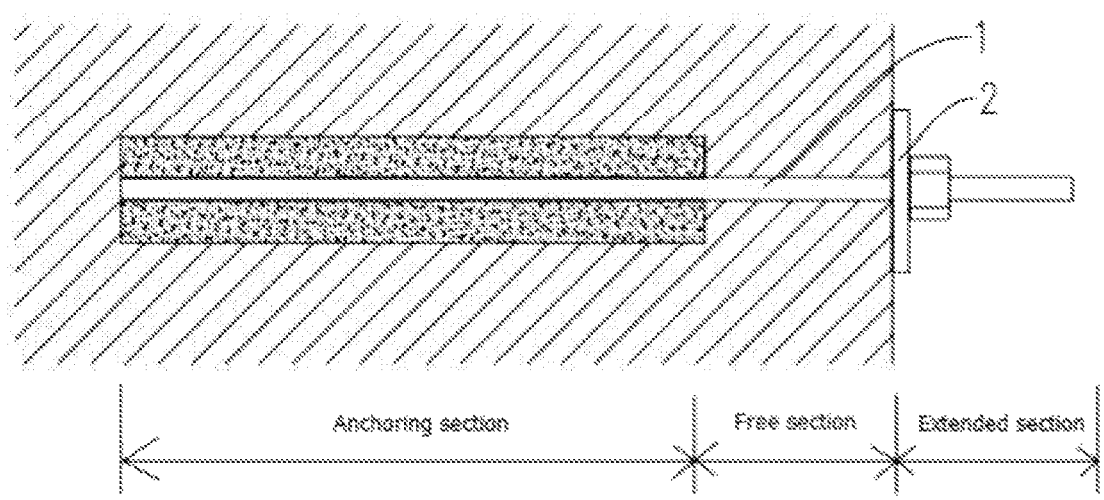
FIG. 1 is a schematic diagram of an anchor bolt in the prior art.
Figure 2:
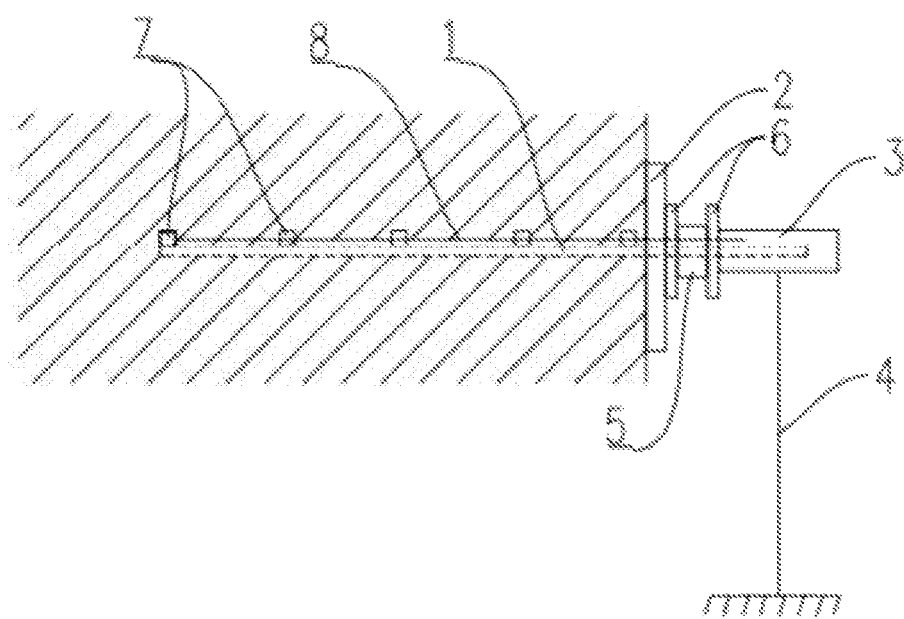
FIG. 2 is a schematic structural diagram of an embodiment according to the present invention.

As shown in FIG. 1 and FIG. 2, this embodiment provides an apparatus for non-destructive testing of an effective anchorage depth of a fully grouted anchor bolt. An anchor bolt 1 is placed in a borehole that is fully filled with an adhesive material, and the anchor bolt 1 is fastened to a rock wall by using a steel plate 2 at an opening of the borehole. In this embodiment, several accelerometers 7 are installed along an axial direction of the anchor bolt 1 in the borehole. An acceleration excitation apparatus 9 (an electromagnetic vibrator is used in this embodiment) and an acceleration monitoring apparatus 10 (an acceleration vibration pickup is used in this embodiment) are disposed at an extended section of the anchor bolt 1. The acceleration monitoring apparatus 10 is electrically connected to the accelerometers 7 in the borehole by using transmission cables 8. The acceleration excitation apparatus 9 and the acceleration monitoring apparatus 10 are installed in a sleeve 3, and are installed at an end of the extended section of the anchor bolt 1 by using the sleeve. The acceleration excitation apparatus 9 is securely connected to the anchor bolt 1 by using a connection rod 11 and a loading ring 12. The acceleration excitation apparatus 9 can apply an axial vibration force to the anchor bolt 1.

In this embodiment, the sleeve 3 is connected to ground by using a vertical stabilizer bar 4. The sleeve 3 is connected to the end of the extended section of the anchor bolt 1 in a manner of capable of axially moving along the anchor bolt 1. In this embodiment, by means of addition of the stabilizer bar, the sleeve 3 and the anchor bolt 1 form an integral body, so as to prevent torque, especially torque in a horizontal direction, from being generated when the anchor bolt 1 is impacted. The torque, especially the torque in the horizontal direction, easily causes side effects to the connection rod, and affects a testing result.

In this embodiment, to evaluate a real force-receiving state of the anchor bolt 1, a compression type dynamometer 5 is disposed between the steel plate 2 and the sleeve 3, so as to review a force applied by the acceleration excitation apparatus 9. A plate 6 is disposed between one end of the compression type dynamometer 5 and the steel plate 2, and a plate 6 is disposed between the other end of the compression type dynamometer 5 and the sleeve 3, so as to ensure that a force is transferred and received uniformly, and to ensure a measurement effect of the dynamometer.

Operation steps of this embodiment are as follows:

S01: Install the anchor bolt

There are two methods for installing a fully grouted anchor bolt. When a method of firstly inserting a bolt and secondly grouting is used, the accelerometers 7 are first fastened to the anchor bolt 1; the anchor bolt 1 is placed in the borehole; the transmission cables 8 are led out; the opening is soundly closed; a grouting pipe and an air exhaust pipe are installed; and the adhesive material is poured.

When a method of firstly grouting and secondly inserting an anchor bolt is used, the blot is instantly inserted after grouting is completed; when the bolt is inserted, the bolt should be slowly pushed, and should not be inserted in an impact approach, so as to ensure a measurement effect of the accelerometers 7; and after being installed, no force should be applied to the anchor bolt 1 within 48 hours.

Figure 3:
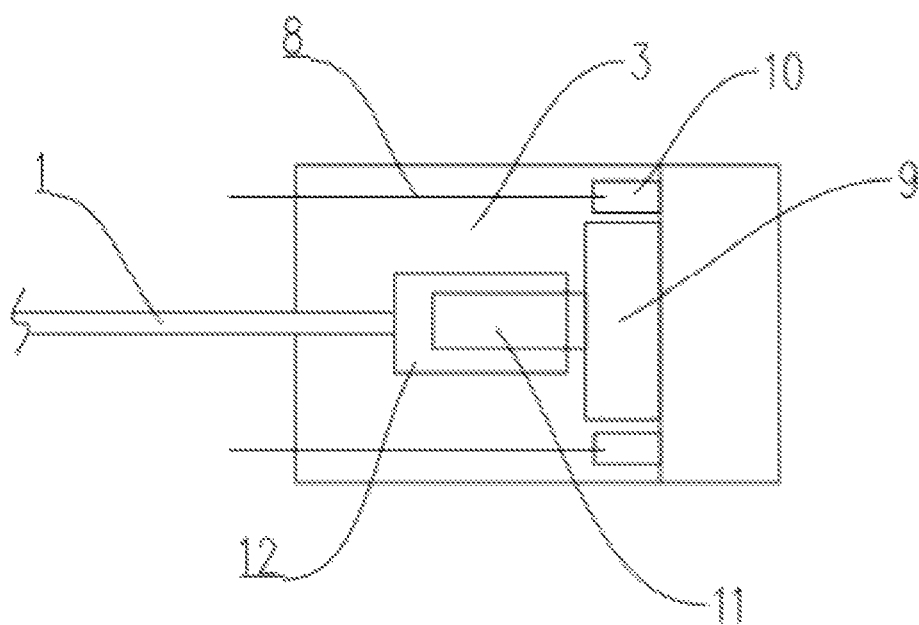
FIG. 3 is a schematic structural diagram of installing an extended section of the anchor bolt according to the embodiment of the present invention.

S02: Install an acceleration excitation apparatus and an acceleration monitoring apparatus After 28 days since the completion of the installation of the anchor bolt, installation is performed according to a structure shown in FIG. 3. The acceleration excitation apparatus 9 and the acceleration monitoring apparatus 10 are installed at the extended section of the anchor bolt 1, and the acceleration monitoring apparatus 10 is connected to the transmission cables 8.

S03: Test an effective anchorage length

A force of 10 KN-50 KN is axially applied to the anchor bolt 1 by using the acceleration excitation apparatus 9, and the force is gradually increased with an increment of 10 KN each time, so as to check a testing result. Acceleration values obtained by the accelerometers 7 are observed by using the acceleration monitoring apparatus 10, where if the anchor bolt 1 is closely adhered to the surrounding rock, and an acceleration value is stable and is small, the position represents an effective anchorage length of the anchor bolt, and if an acceleration value is noticeably vibrated, it is indicated that adhesion of the position is insufficiently close, the anchor bolt is loose, and the position fails to represent an effective anchorage length of the anchor bolt.

What is claimed is:

1. A method for non-destructive testing of an effective anchorage depth of a fully grouted anchor bolt, comprising:
    impacting an end of an extended section of an anchor bolt multiple times with different amplitudes, so as to enable the anchor bolt to generate different accelerations;
    acquiring acceleration values at different depths along the anchor bolt by using several accelerometers disposed at the different depths along the anchor bolt; and
    observing the acceleration values obtained by the accelerometers, wherein if an acceleration value from one of the accelerometers is below a threshold indicating an effective anchorage length of the anchor bolt, it is determined that the anchor bolt, at a depth of the one of the accelerometers, is sufficiently adhered to surrounding rock, and the depth represents an effective anchorage length of the anchor bolt, and otherwise, if the acceleration value is above the threshold, it is determined that adhesion of the anchor bolt at the depth of the one of the accelerometers is insufficient, the anchor bolt is loose, and the depth fails to represent an effective anchorage length of the anchor bolt.

2. The method for non-destructive testing of an effective anchorage depth of a fully grouted anchor bolt according to claim 1, comprising steps as follows:
    S01: installing the anchor bolt, comprising: installing the accelerometers on the anchor bolt, placing the anchor bolt at a center of a borehole, leading out transmission cables connected to the accelerometers, and fastening the anchor bolt to the borehole by using an adhesive material; wherein the anchor bolt is inserted before using the adhesive material such that the accelerometers are first fastened to the anchor bolt, the anchor bolt is placed in the borehole, the transmission cables are led out, the borehole is closed, a grouting pipe and an air exhaust pipe are installed, and the adhesive material is poured;
    S02: installing an acceleration excitation apparatus and an acceleration monitoring apparatus, comprising: installing an acceleration excitation apparatus acceleration monitoring apparatus at the extended section of the anchor bolt after the adhesive material in the borehole reaches a designed strength, and connecting the acceleration monitoring apparatus to the accelerometers by using the transmission cables; and
    S03: testing for an effective anchorage length, comprising: axially applying a force to the anchor bolt by using the acceleration excitation apparatus; and observing, by the acceleration monitoring apparatus, the acceleration values obtained by the accelerometers.

3. The method for non-destructive testing of an effective anchorage depth of a fully grouted anchor bolt according to claim 2, wherein the force in step S03 is 10 KN-50 KN, and the force is gradually increased an increment of 10 KN each time the acceleration excitation apparatus applies the force to the anchor bolt.

* * * * *